United States Patent
Xu (10) Patent No.: US 12,426,107 B2
(45) Date of Patent: Sep. 23, 2025

(54) LOW-LATENCY WIRELESS AUDIO TRANSMITTING AND RECEIVING METHOD AND DEVICE

(71) Applicant: Nanjing Zgmicro Company Limited, Jiangsu (CN)

(72) Inventor: Bin Xu, Nanjing (CN)

(73) Assignee: Nanjing Zgmicro Company Limited, Nanjing (CN)

( * ) Notice: Subject to any disclaimer, the term of this patent is extended or adjusted under 35 U.S.C. 154(b) by 378 days.

(21) Appl. No.: 18/127,504

(22) Filed: Mar. 28, 2023

(65) Prior Publication Data

US 2023/0276515 A1  Aug. 31, 2023

Related U.S. Application Data

(63) Continuation of application No. PCT/CN2021/095018, filed on May 21, 2021.

(51) Int. Cl.
*H04W 76/14* (2018.01)
*H04R 1/10* (2006.01)

(52) U.S. Cl.
CPC .......... *H04W 76/14* (2018.02); *H04R 1/1041* (2013.01)

(58) Field of Classification Search
CPC ....... H04W 76/14; H04W 76/15; H04W 4/80; H04R 1/1041
USPC ........................................................ 370/329
See application file for complete search history.

(56) References Cited

U.S. PATENT DOCUMENTS

| | | | |
|---|---|---|---|
| 10,412,481 B1 * | 9/2019 | Wu | H04R 5/033 |
| 10,959,128 B2 * | 3/2021 | Chen | H04L 1/16 |
| 2018/0213395 A1 * | 7/2018 | Choi | H04W 76/14 |
| 2021/0266808 A1 * | 8/2021 | Avadhanam | H04W 36/304 |
| 2022/0014295 A1 * | 1/2022 | Bonde | H04J 3/0632 |
| 2022/0070247 A1 * | 3/2022 | Wang | G06F 3/165 |
| 2022/0103607 A1 * | 3/2022 | Young | G06F 3/167 |
| 2022/0110018 A1 * | 4/2022 | Jha | H04W 74/0816 |

FOREIGN PATENT DOCUMENTS

| | | | | |
|---|---|---|---|---|
| WO | WO-2020124610 A1 * | 6/2020 | | |
| WO | WO-2020124611 A1 * | 6/2020 | | H04W 28/18 |
| WO | WO-2023101712 A1 * | 6/2023 | | H04L 12/4633 |

\* cited by examiner

*Primary Examiner* — Asad M Nawaz
*Assistant Examiner* — Michael Wayne Maddox
(74) *Attorney, Agent, or Firm* — Zhong Law, LLC (57) ABSTRACT

A wireless audio transmitting method is provided in the present invention. The wireless audio transmitting method comprises: establishing a connected isochronous stream link based on a high-speed physical layer with an audio receiving device by an audio transmitting device, wherein a minimum data transmission rate of the high-speed physical layer is higher than a maximum data transmission rate of a BLE physical layer; and transmitting a first audio data to the audio receiving device through the connected isochronous stream link based on the high-speed physical layer by the audio transmitting device.

14 Claims, 2 Drawing Sheets

--- an audio transmitting device establishes a connected isochronous stream link based on a high-speed physical layer with an audio receiving device, wherein a minimum data transmission rate of the high-speed physical layer is higher than a maximum data transmission rate of a BLE physical layer — 11 the audio transmitting device transmits a first audio data to the audio receiving device through the connected isochronous stream link based on the high-speed physical layer — 12

LOW-LATENCY WIRELESS AUDIO TRANSMITTING AND RECEIVING METHOD AND DEVICE

CROSS-REFERENCES TO RELATED APPLICATIONS

The present invention is a continuation of PCT/CN2021/095018, filed on May 21, 2021, which claims the priority of Chinese Patent Application No.: 202011050965.3 filed in China on Sep. 29, 2020, the entire contents of which are incorporated herein by reference.

FIELD OF THE INVENTION

The present invention relates to the field of wireless communication, and more particularly, to wireless audio transmitting and receiving method and device that provides a low-latency audio transmission service.

BACKGROUND TECHNOLOGY

Wireless audio technology brings people unrestrained freedom of conversation or music enjoyment, and has been widely loved by people. Especially, the latest BLE (Bluetooth Low Energy) audio technology based on a Connected Isochronous Stream (CIS) protocol and a Low Complexity Communication Codec (LC3) technology will bring people wireless audio services with lower power consumption, lower cost and higher performance. The CIS protocol specifies that a CIS event occurs at an isochronous interval, and each CIS event consists of one or more CIS sub-events. A transmitter sends data in each CIS sub-event, and a receiver receives data and responds with an acknowledgement (ACK) in each CIS sub-event. There is a time limit for sending data each time, and data received outside the time limit will be discarded. Thus, data transmission efficiency and synchronization performance can be guaranteed.

A transmission rate of a BLE physical layer (PHY) is responsible for sending and receiving data packets through the physical channel and works in a 2.4 GHz ISM (Industrial Scientific Medical) wireless frequency band. The transmission rate in use is relatively low. The maximum data transmission rate of the BLE physical layer in a latest version of Bluetooth specification 5.2 is only 1 Mbps or 2 Mbps, so it is difficult to provide wireless audio services that demands ultra-low latency and no compression loss. In particular, it cannot meet the needs of gaming headset players who require very little latency and high audio quality. However, traditional high-speed short-distance wireless communication technologies, such as a wireless local area network (LAN) IEEE802.11n protocol, are limited by their complex data transmission mechanisms and cannot meet the requirements of ultra-low latency and high performance.

SUMMARY OF THE INVENTION

One purpose of the present invention is to provide a wireless audio transmitting method, a wireless audio receiving method, a wireless audio transmitting device and a wireless audio receiving device, which can provide low latency audio transmission service.

To achieve the purpose, according one aspect of the present invention, a wireless audio transmitting method is provided. The wireless audio transmitting method comprises: establishing a connected isochronous streaming link based on a high-speed physical layer with an audio receiving device by an audio transmitting device, wherein a minimum data transmission rate of the high-speed physical layer is higher than a maximum data transmission rate of a BLE physical layer; and transmitting first audio data to the audio receiving device through the connected isochronous streaming link based on the high-speed physical layer by the audio transmitting device.

According to another aspect of the present invention, a wireless audio receiving method is provided. The wireless audio receiving method comprises: establishing a connected isochronous streaming link based on a high-speed physical layer with an audio transmitting device by an audio receiving device, wherein a minimum data transmission rate of the high-speed physical layer is higher than a maximum data transmission rate of a BLE physical layer; and receiving a first audio data from the audio transmitting device through the connected isochronous streaming link based on the high-speed physical layer by the audio receiving device.

According to one another aspect of the present invention, a wireless audio transmitting device is provided. The wireless audio transmitting device comprises: a wideband RF transceiver module; and a baseband data and protocol processor configured to drive the wideband RF transceiver module to establish a connected isochronous streaming link based on a high-speed physical layer with an audio receiving device, and transmit a first audio data to the audio receiving device through the connected isochronous streaming link based on the high-speed physical layer.

One of the objectives, advantages and benefits in the present invention is to establish the connected isochronous streaming link between the audio receiving device and the audio transmitting device based on the high-speed physical layer with the data transmission rate higher than that of the BLE physical layer, thereby providing the low-latency wireless audio transmission service.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

As mentioned above, Bluetooth Low Energy (BLE) audio technology brings wireless audio services with lower power consumption, lower cost and higher quality. In particular, the BLE audio technology based on a Connected Isochronous stream (CIS) protocol and a Low Complexity Communication Codec (LC3) technology can provide wireless audio services with lower power and cost and higher performance. However, the maximum transmission rate of the BLE audio technology is relatively low, which limits the improvement of wireless audio quality. In the prior art, a symbol period of GFSK modulation used in the BLE audio technology can be reduced in order to increase the transmission rate of the BLE audio technology.

Due to the low transmission rate of the BLE audio technology and the fact that the BLE audio must rely on high compression rate audio coding technology, it is difficult for the BLE audio to provide ultra-low latency wireless audio service without compression loss, especially for gaming headset players who require very high latency and audio quality. Therefore, the BLE audio still has performance problems in scenarios that require ultra-low latency. Due to the design purpose of wireless LAN protocols, it cannot meet the audio performance requirements such as high real-time and ultra-low latency. Hence, it is difficult to meet the ultra-low latency and high performance requirements by directly adopting traditional high-speed communication technologies, such as wireless LAN IEEE802.11n protocol.

To solve this problem, a wireless audio transmitting method and a wireless audio receiving method that can achieve ultra-low latency transmission are provided. An audio transmitting device establishes a connected isochronous stream (CIS) link based on a high-speed physical layer with an audio receiving device. A minimum data transmission rate of the high-speed physical layer is higher than a maximum data transmission rate of a BLE physical layer. The audio transmitting device transmits a first audio data to the audio receiving device through the CIS link based on the high-speed physical layer. The first audio data can be an audio data without compression loss or an unencoded audio data.

Among short-distance wireless communication technologies commonly used in the prior art, a maximum data transmission rate of the wireless local area network (LAN) IEEE802.11a can reach 54 Mbps, a maximum data transmission rate of IEEE802.11b can reach 11 Mbps. The wireless ultra-wideband UWB can reach tens of megabits per second to hundreds of megabits per second, which is much higher than Bluetooth and IEEE 802.11n.

The connected isochronous stream (CIS) link established based on the high-speed physical layer is configured to transmit audio data, and a limited number of transmissions, retransmissions and reception acknowledgments of audio data can be achieved within an isochronous interval of the CIS link, which can significantly improve the audio data transmission efficiency based on the high-speed physical layer and reduce the latency. In one preferred embodiment, the high-speed physical layer with a data transmission rate not lower than 4 Mbps can be used to transmit and receive data packets via physical channels. In another preferred embodiment, one or more parameters of the isochronous interval (ISO_Interval), sub-event interval (Sub_Interval), minimum sub-event space (T_MSS), time interval between data packets (Data) and acknowledgement packets (ACK) of the CIS link based on the high-speed physical layer are set so that they are smaller than the corresponding parameters applicable in the CIS link based on the BLE physical layer, so as to obtain ultra-low latency communication.

In a specific embodiment, the audio transmitting device may also establish a BLE asynchronous connection-oriented (ACL) link with the audio receiving device based on the BLE physical layer, and negotiate parameters required to establish the CIS link through the BLE ACL link, thereby establishing the CIS link based on the high-speed physical layer.

Figure 2:
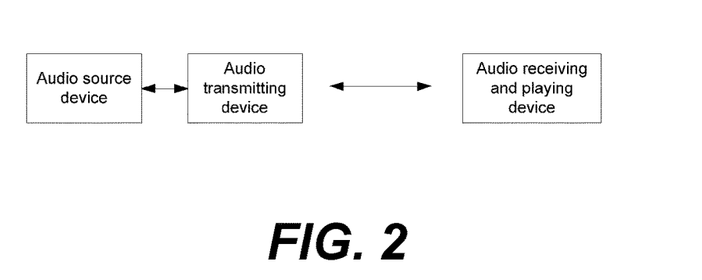
FIG. 2 is a schematic diagram of a wireless audio transmission scenario provided according to one embodiment of the present invention.

FIG. 2 is a schematic diagram of a wireless audio transmission scenario provided according to one embodiment of the present invention. The devices that constitute an ultra-low latency wireless audio system in this scenario comprise an audio source device, an audio transmitting device, and an audio receiving and playing devices. In specific embodiment, the audio source device can be any one of TV, computer, smartphone and audio storage device etc. The audio transmitting device is connected to the audio source device through wired or wireless connection, and the audio receiving and playing device is connected to the audio transmitting device wirelessly. The wired connection can be any one of an audio cable, USB interface, I2S interface or high-speed SPI, etc. The wireless connection can be a wireless connection implemented based on a standard or dedicated wireless communication protocol such as Bluetooth communication protocol, wireless LAN communication protocol, etc. In this scenario, the wireless connection can be a BLE ACL link, a BLE CIS link based on the BLE physical layer and the CIS link based on the high-speed physical layer PHY. The high-speed physical layer PHY may specifically employ one of a wireless LAN physical layer PHY, a wireless ultra-wideband physical layer PHY or other customized physical layer PHY with a minimum data transmission rate higher than the maximum data transmission rate of the BLE physical layer PHY, etc. In one embodiment, the high-speed physical layer PHY is the IEEE 802.11n wireless local area network physical layer.

Figure 1:
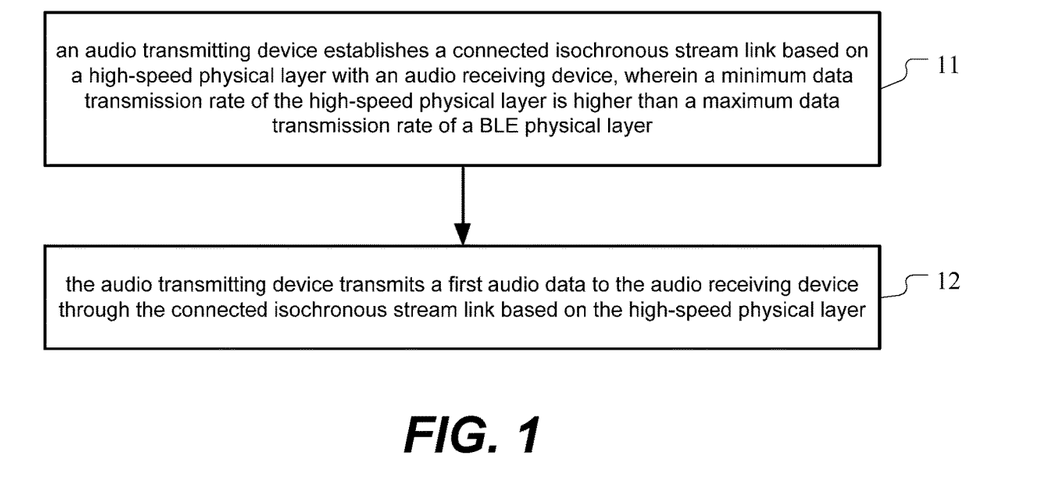
FIG. 1 is a flowchart of a wireless audio transmitting method provided according to one embodiment of the present invention.

FIG. 1 is a flowchart of a wireless audio transmitting method provided according to one embodiment of the present invention. As shown in FIG. 1, the wireless audio transmitting method comprises the following operations.

At 11, the audio transmitting device establishes a connected isochronous stream (CIS) link based on a high-speed physical layer with the audio receiving device, wherein a minimum data transmission rate of the high-speed physical layer is higher than a maximum data transmission rate of a BLE physical layer.

In different embodiments, the high-speed physical layer may be one of a wireless LAN physical layer, a wireless ultra-wideband physical layer, or other predetermined wideband physical layer. The minimum data transmission rate of the used high-speed physical layer should be higher than the maximum data transmission rate of the BLE physical layer. In an optional embodiment, the data transmission rate of the high-speed physical layer is not lower than 4 Mbps, and 4 Mbps is determined based on a minimum requirement of the data transmission rate for transmitting lossless high-fidelity audio.

In one embodiment, the audio transmitting device may establish a BLE asynchronous connection-oriented (ACL) link based on the BLE physical layer with the audio receiving device. The audio transmitting device establishes the connected isochronous stream link based on the high-speed physical layer with the audio receiving device through the BLE asynchronous connection-oriented link.

Usually, before the CIS link based on the high-speed physical layer is established, it may first be determined whether the audio receiving device has the capability of establishing the CIS link for transmission. Therefore, in one embodiment, the audio transmitting device can confirm whether the audio receiving device supports an ultra-low latency wireless audio transmission through the BLE asynchronous connection-oriented link.

If the audio receiving device does not support the ultra-low latency wireless audio transmission, the audio transmitting device establishes the BLE connected isochronous stream link based on the BLE physical layer with the audio receiving device through the BLE asynchronous connection-oriented link, transmits a second audio data to the audio receiving device through the BLE connected isochronous stream link, or, the audio transmitting device transmits the second audio data to the audio receiving device through the BLE asynchronous connection-oriented link.

If the audio receiving device supports the ultra-low latency wireless audio transmission, the audio transmitting device establishes the connected isochronous stream link based on the high-speed physical layer with the audio receiving device through the BLE asynchronous connection-oriented link.

In one embodiment, whether the audio receiving device supports the ultra-low latency wireless audio transmission is confirmed by accessing a generic attribute profile (GATT) of the audio receiving device. Services supported by one device can be learned by querying the general attribute profile (GATT) of the device. The device that supports the ultra-low-latency wireless audio transmission may have feature values or services that characterize this capability. The audio transmitting device can know the capabilities of the audio receiving device by querying the GATT of the audio receiving device. In another alternative embodiment, instead of querying the GATT, it is possible to confirm whether the receiving device supports ultra-low-latency wireless audio transmission in other ways.

In one embodiment, the second audio data may be encoded BLE audio data.

In one embodiment, the high-speed physical layer may be an IEEE 802.11n wireless local area network physical layer. In a specific implementation, the CIS link based on the high-speed physical layer is configured to use 20 MHz bandwidth, support an isochronous interval of 1.25 ms or 2.5 ms, set a time interval between an audio data packet and an acknowledgement packet as a short inter-frame space (SIFS), and set a minimum sub-event space (T_MSS) as the short inter-frame space. In a packet sequence, the time interval between two consecutive packets is called the inter-frame space (IFS). SIFS is the shortest inter-frame space, which is usually used to space packets that require an immediate response.

Figure 5:
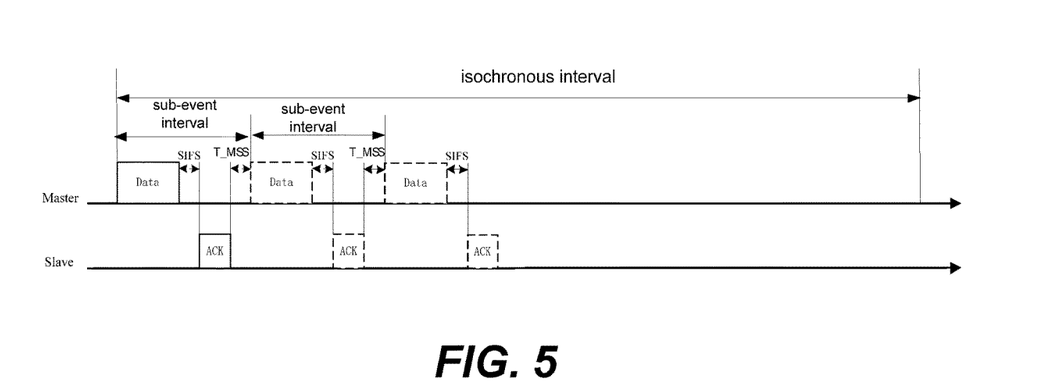
FIG. 5 is a time slot structure diagram of a connected isochronous stream link based on a high-speed physical layer provided according to one embodiment of the present invention.

FIG. 5 is a time slot structure diagram of the connected isochronous stream link using the high-speed physical layer provided according to one embodiment of the present invention. As shown in FIG. 5, within the isochronous interval (ISO_Interval), a master can transmit an audio packet data (Data) several times until an acknowledgement packet (ACK) from a slave is correctly received or the maximum number of transmissions or sub-events is reached. Compared with the BLE physical layer, the CIS link based on the high-speed physical layer uses smaller ISO_Interval, smaller Sub_Interval, shorter Minimum Sub-event Space (T_MSS), and smaller time interval between the audio data packet and the acknowledgement packet, which can improve transmission efficiency. Referring to the above structure, in a specific embodiment, the high-speed physical layer using 20 MHz bandwidth, such as IEEE802.11n physical layer, can be used, ISO_Interval is set to 1.25 ms and 2.5 ms, the time interval between Data and ACK is set as SIFS, and T_MSS is set as SIFS.

At 12, the audio transmitting device transmits a first audio data to the audio receiving device through the connected isochronous stream link based on the high-speed physical layer.

In one embodiment, the first audio data comprises an audio data without compression loss or an unencoded audio data.

In one embodiment, the connected isochronous stream link based on the high-speed physical layer is configured to use 20 MHz bandwidth, adopt the isochronous interval of 1.25 ms or 2.5 ms, set a time interval between the audio data packet and the acknowledgement packet as a short inter-frame space, and set a minimum sub-event space equal to the short inter-frame space.

In this embodiment, the wireless audio transmitting method further comprises: the audio transmitting device transmits an unencoded stereo audio with sampling rate of 48 kHz and quantization bits of 16 bits, and the isochronous interval is 2.5 ms; a size of the audio data packet is 480 bytes, a modulation coding set of IEEE802.11n physical layer with 2.4 GHz ISM frequency band and 20 MHz bandwidth is used, an index value of the modulation coding set is 4, a transmission rate is 39 Mbps, and a HT_GF format, a BCC_CODING method, a LONG_GI protection interval are used, a time length of the audio data packet is 136 us; the acknowledgement packet with the index value of the modulation coding set being equal to 1 is used, the time length of the acknowledgement packet is 40 us, the minimum sub-event space as well as the short inter-frame space is 10 us, the number of sub-events is 3, a maximum transmission latency is 588 us, an audio processing latency is 412 us, and a minimum latency of audio sampling from capture to playback is 3.5 ms.

The biggest challenge is WIFI interference when the wireless audio transmission method provided according to one embodiment of the present invention adopts the high-speed physical layer, especially the wireless local area network physical layer. Usually, because a WIFI packet is long, and the audio data packet in the present invention is relatively short, the WIFI signal may occupy the channel for a relatively long time, thereby interfering with the audio data transmission in the present invention. For this reason, the present invention provides two methods to resist the WIFI interference, one is automatic frequency hopping and the other is dynamic frequency configuration.

In one embodiment, a wireless frequency band in which the high-speed physical layer works is divided into N non-overlapping predetermined bandwidth channels, two adjacent sub-events within one isochronous interval uses different numbered channels based on a predetermined automatic frequency hopping rule, and N is a positive integer greater than 1.

Depending on implementation, the connected isochronous stream link based on the high-speed physical layer is configured to use 2.4 GHz ISM frequency band and 20 MHz bandwidth, divide the 2.4 GHz ISM frequency band into N non-overlapping channels with 20 MHz bandwidth, set their channel numbers to 0~N−1 respectively, wherein N is 2 or 3.

The predetermined automatic frequency hopping rule comprises: the channel number used for transmission of the first sub-event E1 in each isochronous interval is a remainder of dividing a sequence number of the connected isochronous stream event by N, the channel number used for transmission of the sub-event Ex after the first sub-event E1 in each isochronous interval is a remainder of dividing a sum of the channel number used for transmission of the sub-event E1 and a sequence number of the sub-event Ex by N. The sequence number of the connected isochronous stream event is configured to count each CIS event sequentially. It can be understood that the above mathematical method for calculating the frequency hopping channel is only one solution for determining the frequency hopping channel, and different specific manners may also be adopted in different embodiments.

In a more specific embodiment, according to the automatic frequency hopping rule, the 2.4 GHz ISM frequency band is divided into three non-overlapping 20 MHz bandwidth channels, which are numbered 0, 1, 2 respectively. The channel number used for the first transmission in each ISO Interval is a remainder of dividing the sequence number of the current CIS event by 3. The channel number used for the subsequent Sub-Event is the remainder of dividing a sum of the channel number used for transmission of the sub-event E1 and a sequence number of the sub-event Ex by 3. For example, for the first ISO Interval, the channel numbers used for the three sub_events are 0, 1, and 2 respectively. For the second ISO Interval, the channel numbers used for the three sub_events are 1, 2, and 0 respectively. For the third ISO Interval, the channel numbers used for the three sub_events are 2, 0, and 1 respectively.

In another embodiment, the audio transmitting device and the audio receiving device select channels with the predetermined bandwidth that cover the most used channels as channels of the high-speed physical layer according to a channel mapping table of the BLE asynchronous connection-oriented link with adaptive frequency hopping, and update the channel of the high-speed physical layer through the BLE asynchronous connection-oriented link.

Depending on implementation, the audio transmitting device and the audio receiving device select the channels with the 20 MHz bandwidth that covers the most used channels as the channels of the IEEE802.11n physical layer according to a channel mapping table of the BLE asynchronous connection-oriented link with adaptive frequency hopping, and update the channels of the IEEE802.11n physical layer through the BLE asynchronous connection-oriented link.

Depending on a specific implementation, the dynamic frequency configuration, i.e., the channels with the 20 MHz bandwidth that cover the most used channels are selected as the channels of the IEEE802.11n physical layer based on the channel mapping table of adaptive frequency hopping of the BLE ACL link. The channel mapping table is transmitted or negotiated through the BLE ACL link. The BLE CIS link is only used to transmit audio data, while the BLE ACL link has multiple control protocols. The channels of the IEEE802.11n physical layer used by the audio transmitting devices and the audio receiving and playing devices are updated through the BLE ACL link in a time according to the channel changes. It can also be said that the channels of the IEEE802.11n physical layer PHY are negotiated through the BLE ACL link. For example, the channel mapping table of the BLE ACL link is that, used channels include 37, 0-10, 32-36, 39, etc, and other channels including 11-31 and 38 are un-used channels. Since a center of channels 37, 0-10, i.e., 2402-2422 MHz frequency and the 20 MHz bandwidth channel, is at 2412 MHz, a center frequency of the channels of the IEEE802.11n physical layer PHY is set at 2412 MHz.

In a specific embodiment, the audio transmitting device establishes the BLE ACL link with the audio receiving device (which may also be called audio receiving and playing device), and queries the audio receiving device via the BLE ACL link whether it supports the ultra-low latency wireless audio service. If the audio receiving device supports the ultra-low latency wireless audio service, the audio transmitting device establishes the CIS link based on the high speed physical layer PHY with the audio receiving device for transmitting audio data without compression loss or unencoded audio data when transmitting ultra-low latency wireless audio. Conversely, the BLE physical layer PHY is configured to establish the BLE CIS link for transmitting the encoded BLE audio.

According to another aspect of the present invention, a wireless audio receiving method is provided. The wireless audio receiving method comprises the following operations.

At an operation A, the audio receiving device establishes a connected isochronous stream link based on a high-speed physical layer with the audio transmitting device, wherein a minimum data transmission rate of the high-speed physical layer is higher than a maximum data transmission rate of a BLE physical layer.

At an operation B, the audio receiving device receives a first audio data from the audio transmitting device through the connected isochronous stream link based on the high-speed physical layer.

In one embodiment, the audio receiving device establishes a BLE asynchronous connection-oriented link based on the BLE physical layer with the audio transmitting device; and the audio receiving device establishes the connected isochronous stream link based on the high-speed physical layer with the audio transmitting device through the BLE asynchronous connection-oriented link.

Depending on one implementation, the audio receiving device provides a confirmation about whether the audio receiving device supports an ultra-low latency wireless audio transmission to the audio transmitting device through the BLE asynchronous connection-oriented link.

If the audio receiving device does not support the ultra-low latency wireless audio transmission, the audio receiving device establishes the BLE connected isochronous stream link based on the BLE physical layer with the audio transmitting device through the BLE asynchronous connection-oriented link, receives a second audio data from the audio transmitting device through the BLE connected isochronous stream link; or, the audio receiving device receives the second audio data from the audio transmitting device through the BLE asynchronous connection-oriented link.

If the audio receiving device supports the ultra-low latency wireless audio transmission, the audio receiving device establishes the connected isochronous stream link based on the high-speed physical layer with the audio transmitting device through the BLE asynchronous connection-oriented link.

In one embodiment, the second audio data comprises an encoded BLE audio data, and the first audio data comprises an audio data without compression loss or an unencoded audio data.

In one embodiment, the wireless audio receiving method corresponds to the wireless audio transmitting method shown in FIG. 1, so that the first audio data may be audio data without compression loss or unencoded audio data, and the second audio data comprises an encoded BLE audio data.

Similarly, in one embodiment, the high-speed physical layer is any one of a wireless local area network physical layer, a wireless ultra-wideband physical layer, or a predetermined wideband physical layer. The data transmission rate of the high-speed physical layer is not lower than 4 Mbp. In another embodiment, the high speed physical layer comprises an IEEE 802.11n wireless local area network physical layer.

A wireless audio transmitting device that can be used to implement the wireless audio transmitting method is provided according to one aspect of the present invention. The wireless audio transmitting device comprising a baseband data and protocol processor, a wideband RF (radio frequency) transceiver module.

The baseband data and protocol processor is configured to drive the wideband RF transceiver module to establish a connected isochronous stream link based on a high-speed physical layer with an audio receiving device, and transmit a first audio data to the audio receiving device through the connected isochronous stream link based on the high-speed physical layer.

In one embodiment, the wireless audio transmitting device further comprises a BLE RF transceiver module.

The baseband data and protocol processor is configured to drive the BLE RF transceiver module to establish a BLE asynchronous connection-oriented link based on the BLE physical layer with the audio receiving device.

The baseband data and protocol processor drives the wideband RF transceiver module to establish the connected isochronous stream link based on the high-speed physical layer with the audio receiving device through the BLE asynchronous connection-oriented link.

In another embodiment, the baseband data and protocol processor is further configured to confirm whether the audio receiving device supports an ultra-low latency wireless audio transmission through the BLE asynchronous connection-oriented link.

When it is confirmed that the audio receiving device does not support the ultra-low latency wireless audio transmission, the baseband data and protocol processor is configured to drive the BLE radio frequency transceiver module to establish the BLE connected isochronous stream link based on the BLE physical layer with the audio receiving device through the BLE asynchronous connection-oriented link, and transmit a second audio data to the audio receiving device through the BLE connected isochronous stream link; or, the baseband data and protocol processor is configured to transmit the second audio data to the audio receiving device through the BLE asynchronous connection-oriented link.

When it is confirmed that the audio receiving device supports the ultra-low latency wireless audio transmission, the baseband data and protocol processor is configured to drive the wideband RF transceiver module to transmit the first audio data to the audio receiving device through the connected isochronous stream link based on the high-speed physical layer.

Figure 3:
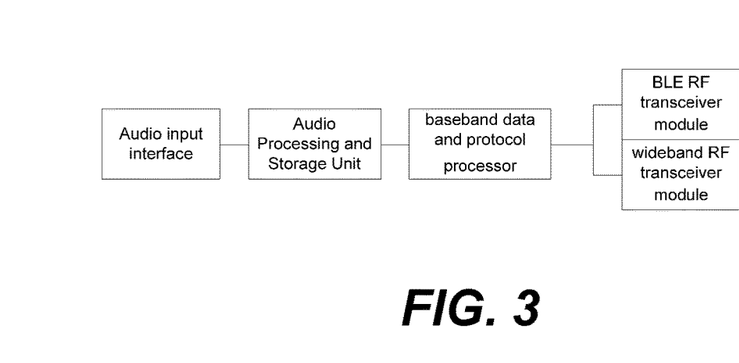
FIG. 3 is a structural diagram of a wireless audio transmitting device provided according to one embodiment of the present invention.

FIG. 3 is a structural diagram of a wireless audio transmitting device provided according to one embodiment of the present invention. As shown in FIG. 3, the audio transmitting device comprises: an audio input interface, an audio processing and storage unit, a baseband data and protocol processor, a BLE RF transceiver module and a wideband RF transceiver module.

The audio processing and storage unit that is configured to perform one or more of filtering, noise cancellation, coding, and equalization processing on audio data input through the audio input interface, and/or store audio data input through the audio input interface.

The baseband data and protocol processor is configured for driving the BLE RF transceiver module to transmit the second audio data to the audio receiving device according to a BLE CIS protocol; or, driving the wideband RF transceiver module to transmit the first audio data to the audio receiving device according to the CIS protocol based on the high-speed physical layer. The first audio data, the second audio data are obtained based on the audio data provided by the audio processing and storage unit.

The BLE RF transceiver module is driven by the baseband data and protocol processor to establish the BLE CIS link or the BLE asynchronous connection-oriented link with the audio receiving device, transmit the second audio data to the audio receiving device through the BLE CIS link or the BLE asynchronous connection-oriented link; or, establish the BLE asynchronous connection-oriented link with the audio receiving device, confirm whether the audio receiving device supports the ultra-low latency wireless audio transmission.

The wideband RF transceiver module is driven by the baseband data and protocol processor to establish the CIS link based on the high-speed physical layer with the audio receiving device, transmit the first audio data to the audio receiving device through the CIS link based on the high-speed physical layer.

Depending on a specific implementation, the audio transmitting device comprises the audio input interface, the audio processing and storage unit, the baseband data and protocol processor, the BLE RF transceiver module providing the BLE physical layer PHY, and the wideband RF transceiver module providing the high-rate physical layer PHY. The audio input interface may be wireless input interface or/and wired input interface. The wired input interface comprises one of audio line interface, USB interface, I2S interface or high-speed SPI, etc. The audio processing and storage unit is configured to perform one or more of filtering, noise cancellation, coding, and equalization processing on audio data, and/or store audio data. The audio transmitting device gets the external audio data through the audio input interface or gets the internal stored audio data through the audio processing and storage unit, which is transmitted to the audio receiving device. The baseband data and protocol processor is configured to perform the BLE protocol or the BLE CIS protocol, the CIS protocol using the high speed physical layer PHY, a control program of the BLE RF transceiver module and the wideband RF transceiver module. The BLE RF transceiver module is configured to establish the BLE ACL link and the BLE CIS link between the audio transmitting device and the audio receiving device, to transmit the BLE audio data, as well as to assist in establishing the CIS link based on the high speed physical layer PHY. The wideband RF transceiver module is configured for the audio transmitting device to transmit high-quality audio data, such as audio data without compression loss or unencoded audio data, to the audio receiving device through the CIS link based on the high speed physical layer PHY.

In one embodiment of the present invention, the BLE ACL protocol and the BLE CIS protocol can be executed simultaneously, and the BLE ACL protocol and the CIS protocol based on the high-speed physical layer can be executed simultaneously, but the BLE CIS protocol and the CIS protocol based on the high-speed physical layer need not be executed simultaneously. In other implementation manners, the situation of establishing two links at the same time is not excluded, that is, one or more BLE CIS links based on the BLE physical layer PHY and one or more CIS links based on high-speed physical layer are established.

A wireless audio receiving device is provided according to another aspect of the present invention. The wireless audio receiving device may be used to implement the wireless audio receiving method described in the preceding embodiment. The wireless audio receiving device comprises a baseband data and protocol processor, a wideband RF transceiver module.

The baseband data and protocol processor is configured to drive the wideband RF transceiver module to establish a connected isochronous stream link based on a high-speed physical layer with the wireless audio transmitting device, and receive a first audio data from the wireless audio transmitting device through the connected isochronous stream link based on the high-speed physical layer.

In one embodiment, the wireless audio receiving device further comprises a BLE RF transceiver module.

The baseband data and protocol processor is configured to drive the BLE RF transceiver module to establish a BLE asynchronous connection-oriented link with the wireless audio transmitting device based on the BLE physical layer.

The BLE RF transceiver module is driven by the baseband data and protocol processor to receive the second audio data from the wireless audio transmitting device through the BLE asynchronous connection-oriented link. Or, the BLE RF transceiver module enables the wideband RF transceiver module to establish the connected isochronous stream link based on the high-speed physical layer with the wireless audio transmitting device, and receive the first audio data from the wireless audio transmitting device through the connected isochronous stream link based on the high-speed physical layer. Or, the BLE RF transceiver module establish the connected isochronous stream based on the BLE physical layer with the wireless audio transmitting device via the BLE asynchronous connection-oriented link, and receives the second audio data from the wireless audio transmitting device through the connected isochronous stream based on the BLE physical layer.

In another embodiment, the baseband data and protocol processor is configured to set whether the present device supports an ultra-low latency wireless audio services via a generic attribute profile and provide queries of the generic attribute profile to the wireless audio transmitting device via the BLE asynchronous connection-oriented link.

Figure 4:
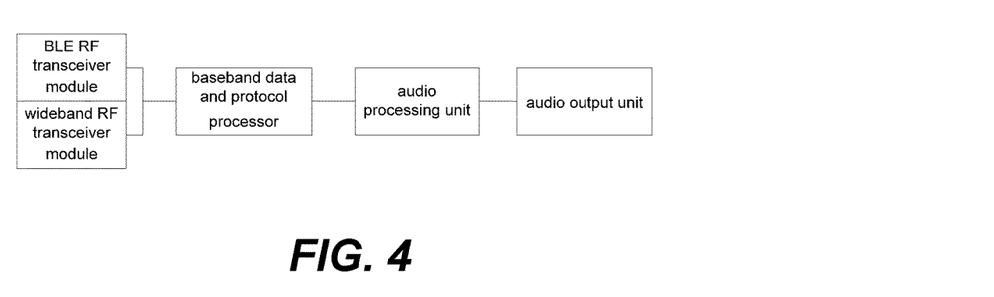
FIG. 4 is a structural diagram of a wireless audio receiving device provided according to one embodiment of the present invention.

FIG. 4 is a structural diagram of a wireless audio receiving device provided according to one embodiment of the present invention. As shown in FIG. 4, the wireless audio receiving device comprises: a BLE RF transceiver module, a wideband RF transceiver module, a baseband data and protocol processor, and an audio output unit.

The BLE RF transceiver module is configured for establishing a BLE connected isochronous stream link or a BLE asynchronous connection-oriented link with the audio transmitting device, being driven by the baseband data and protocol processor to receives a second audio data from the audio transmitting device through the BLE connected isochronous stream link or the BLE asynchronous connection-oriented link; or, establishing the BLE asynchronous connection-oriented link with the audio transmitting device, and providing a confirmation about whether the audio receiving device supports the ultra-low latency wireless audio transmission to the audio transmitting device.

The wideband RF transceiver module driven by the baseband data and protocol processor is configured to establish the connected isochronous stream link based on the high-speed physical layer with the audio transmitting device and receive the first audio data from the audio transmitting device.

The baseband data and protocol processor drives the BLE RF transceiver module to receive the second audio data from the audio receiving device according to the BLE connected isochronous stream protocol; or, drives the wideband RF transceiver module to receive the first audio data from the audio receiving device at least according to the connected isochronous stream protocol based on the high-speed physical layer.

The audio output unit is configured to perform one or more of decoding, filtering, noise cancellation, or equalization processing of the received audio data.

In one embodiment, the wireless audio receiving device may further comprise an audio playback unit, which is configured for converting the audio data into an audio signal, outputting or playing the audio signal.

According to a specific embodiment, the ultra-low latency wireless audio receiving device may be an audio receiving and playing device comprising a BLE RF transceiver module providing a BLE physical layer PHY, a wideband RF transceiver module providing a high speed physical layer PHY, a baseband data and protocol processor, and an audio processing and output unit. The BLE RF transceiver module is configured to establish a BLE ACL link and a BLE CIS link between the audio receiving and playback device and the audio transmitting device, transmit LE audio data, and assist in establishing the CIS link base on the high speed physical layer PHY. The wideband RF transceiver module is configured for the audio receiving and playback device to receive high-quality audio data, such as audio data without compression loss or unencoded audio data, from the audio transmitting device through the CIS link base on the high speed physical layer PHY. The baseband data and protocol processor is configured to execute the BLE protocol or the BLE CIS protocol, the CIS protocol base on the high speed physical layer PHY, control programs of the BLE RF transceiver module and the wideband RF transceiver module. The audio processing and output unit is configured to perform one or more of decoding, filtering, noise cancellation, or equalization processing on the audio data, and output or play the audio signal. As can be seen from the above embodiments, in the BLE audio transmission of the present invention, the high-speed physical layer represented by the wireless LAN physical layer is used as an optional physical layer to transmit audio data without compression loss or without encoding based on CIS transmission rules, and the automatic frequency hopping or the dynamic frequency configuration method is used to resist the WIFI interference to stabilize communication performance, thus providing the wireless audio transmission service with ultra-low latency, high sound quality and resistance to WIFI interference.

Those skilled in the art should be aware that the embodiments of the present invention may be methods, systems, or computer program products. Accordingly, the present invention may take the form of a complete hardware embodiment, a complete software embodiment, or an embodiment in conjunction with software and hardware aspects. Furthermore, the present invention may take the form of a computer program product implemented on one or more computer-available storage media (comprising, but not limited to, disk memory, CD-ROM, optical memory, etc.) containing computer-available program code.

The present invention is described with reference to methods, equipment (systems), and flow charts and/or block diagrams of computer program products according to the embodiment of the present invention. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

These computer program instructions may also be stored in a computer-readable memory that may guide a computer or other programmable data processing device to work in a particular way, such that the instructions stored in the computer-readable memory generate a manufacturer comprising an instruction device that is implemented in a flow chart one or more processes. Process and/or block diagram, a box or function specified in multiple boxes.

These computer program instructions may also be loaded on a computer or other programmable data processing device such that a series of operational steps are performed on a computer or other programmable device to produce computer-implemented processing, thereby providing instructions executed on a computer or other programmable device for implementing a flow chart. The steps of a process or multiple processes and/or block diagrams, or functions specified in a box.

Although preferred embodiments of the present invention have been described, additional changes and modifications to these embodiments may be made once the basic creative concepts are known to those skilled in the art. The appended claims are therefore intended to be interpreted to comprise preferred embodiments and all changes and modifications falling within the scope of the present invention.

Obviously, a person skilled in the art may make various changes and variations to the application without departing from the spirit and scope of the application. Thus, if these modifications and variations of the present invention fall within the scope of the claims and their equivalent technologies, the application is also intended to comprise these changes and variations.

I claim:

1. A wireless audio transmitting method, comprising:
    establishing a connected isochronous stream link based on a high-speed physical layer with an audio receiving device by an audio transmitting device, wherein a minimum data transmission rate of the high-speed physical layer is higher than a maximum data transmission rate of a Bluetooth Low Energy (BLE) physical layer, wherein said establishing a connected isochronous stream link further comprises:
        establishing a BLE asynchronous connection-oriented link based on the BLE physical layer with the audio receiving device by the audio transmitting device; and
        establishing the connected isochronous stream link based on the high-speed physical layer with the audio receiving device through the BLE asynchronous connection-oriented link by the audio transmitting device; and
    transmitting a first audio data to the audio receiving device through the connected isochronous stream link based on the high-speed physical layer by the audio transmitting device;
    confirming whether the audio receiving device supports an ultra-low latency wireless audio transmission through the BLE asynchronous connection-oriented link by the audio transmitting device;
    establishing the BLE connected isochronous stream link based on the BLE physical layer with the audio receiving device through the BLE asynchronous connection-oriented link by the audio transmitting device, transmitting a second audio data to the audio receiving device through the BLE connected isochronous stream link; or, transmitting the second audio data to the audio receiving device through the BLE asynchronous connection-oriented link by the audio transmitting device if the audio receiving device does not support the ultra-low latency wireless audio transmission; and
    establishing the connected isochronous stream link based on the high-speed physical layer with the audio receiving device through the BLE asynchronous connection-oriented link by the audio transmitting device if the audio receiving device supports the ultra-low latency wireless audio transmission.

2. The method according to claim 1, wherein said confirming whether the audio receiving device supports an ultra-low latency wireless audio transmission, comprises:
    confirming whether the audio receiving device supports the ultra-low latency wireless audio transmission by accessing a generic attribute profile of the audio receiving device, wherein the second audio data comprises an encoded BLE audio data, and the first audio data comprises an audio data without compression loss or an unencoded audio data.

3. The method according to claim 1, wherein the data transmission rate of the high-speed physical layer is not lower than 4 Mbps.

4. The method according to claim 3, wherein the high-speed physical layer comprises any one of a wireless local area network physical layer, a wireless ultra-wideband physical layer, or a predetermined wideband physical layer.

5. The method according to claim 4, wherein the high speed physical layer comprises an IEEE 802.11n wireless local area network physical layer.

6. The method according to claim 1, wherein a wireless frequency band in which the high-speed physical layer works is divided into N non-overlapping predetermined bandwidth channels, two adjacent sub-events within one isochronous interval uses different numbered channels based on a predetermined automatic frequency hopping rule, and N is a positive integer greater than 1.

7. The method according to claim 6, wherein the connected isochronous stream link based on the high-speed physical layer is configured to use 2.4 GHz ISM frequency band and 20 MHz bandwidth, divide the 2.4 GHz ISM frequency band into N non-overlapping channels with 20 MHz bandwidth, set their channel numbers to 0~N−1 respectively, with N being 2 or 3;

the predetermined automatic frequency hopping rule comprises: the channel number used for transmission of the first sub-event E1 in each isochronous interval is a remainder of dividing a sequence number of the connected isochronous stream event by N, the channel number used for transmission of the sub-event Ex after the first sub-event E1 in each isochronous interval is a remainder of dividing a sum of the channel number used for transmission of the sub-event E1 and a sequence number of the sub-event Ex by N.

8. The method according to claim 1, further comprising:
selecting channels with the predetermined bandwidth that cover the most used channels as channels of the high-speed physical layer according to a channel mapping table of the BLE asynchronous connection-oriented link with adaptive frequency hopping by the audio transmitting device and the audio receiving device; and
updating the channels of the high-speed physical layer through the BLE asynchronous connection-oriented link.

9. The method according to claim 1, wherein the connected isochronous stream link based on the high-speed physical layer is configured to use 20 MHz bandwidth, adopt the isochronous interval of 1.25 ms or 2.5 ms, set a time interval between an audio data packet and an acknowledgement packet as a short inter-frame space, and set a minimum sub-event space as the short inter-frame space, the wireless audio transmitting method further comprises:
the audio transmitting device transmits an unencoded stereo audio with sampling rate of 48 KHz and quantization bits of 16 bits, and the isochronous interval is 2.5 ms; a size of the audio data packet is 480 bytes, a modulation coding set of IEEE802.11n physical layer with 2.4 GHz ISM frequency band and 20 MHz bandwidth is used, an index value of the modulation coding set is 4, a transmission rate is 39 Mbps, and a HT_GF format, a BCC_CODING method, a LONG_GI protection interval are used, a time length of the audio data packet is 136 us;
an acknowledgement packet with the index value of the modulation coding set being equal to 1 is used, the time length of an acknowledgement packet is 40 us,
a minimum sub-event space as well as the short inter-frame space is 10 us, the number of sub-events is 3, a maximum transmission latency is 588 us, an audio processing latency is 412 us, and a minimum latency of audio sampling from capture to playback is 3.5 ms.

10. A wireless audio receiving method, comprising:
establishing a connected isochronous stream link based on a high-speed physical layer with an audio transmitting device by an audio receiving device, wherein a minimum data transmission rate of the high-speed physical layer is higher than a maximum data transmission rate of a BLE physical layer, wherein said establishing a connected isochronous stream link comprises:
establishing a BLE asynchronous connection-oriented link based on the BLE physical layer with the audio transmitting device by the audio receiving device; and
establishing the connected isochronous stream link based on the high-speed physical layer with the audio transmitting device through the BLE asynchronous connection-oriented link by the audio receiving device;
receiving a first audio data from the audio transmitting device through the connected isochronous stream link based on the high-speed physical layer by the audio receiving device;
providing a confirmation about whether the audio receiving device supports an ultra-low latency wireless audio transmission to the audio transmitting device through the BLE asynchronous connection-oriented link by the audio receiving device;
establishing the BLE connected isochronous stream link based on the BLE physical layer with the audio transmitting device through the BLE asynchronous connection-oriented link by the audio receiving device, receiving a second audio data from the audio transmitting device through the BLE connected isochronous stream link; or, receiving the second audio data from the audio transmitting device through the BLE asynchronous connection-oriented link by the audio receiving device if the audio receiving device does not support the ultra-low latency wireless audio transmission; and
establishing the connected isochronous stream link based on the high-speed physical layer with the audio transmitting device through the BLE asynchronous connection-oriented link by the audio receiving device if the audio receiving device supports the ultra-low latency wireless audio transmission.

11. The method according to claim 10, wherein the audio receiving device provides a confirmation about whether the audio receiving device supports the ultra-low latency wireless audio transmission to the audio transmitting device through its generic attribute profile, the second audio data comprises an encoded BLE audio data, and the first audio data comprises an audio data without compression loss or an unencoded audio data, the data transmission rate of the high-speed physical layer is not lower than 4 Mbp.

12. The method according to claim 11, wherein the high-speed physical layer comprises any one of a wireless local area network physical layer, a wireless ultra-wideband physical layer, or a predetermined wideband physical layer.

13. A wireless audio transmitting device, comprising:
a wideband RF transceiver module;
a baseband data and protocol processor configured to drive the wideband RF transceiver module to establish a connected isochronous stream link based on a high-speed physical layer with an audio receiving device, and transmit a first audio data to the audio receiving device through the connected isochronous stream link based on the high-speed physical layer; and
a BLE RF transceiver module, wherein the baseband data and protocol processor is configured to drive the BLE RF transceiver module to establish a BLE asynchronous connection-oriented link based on the BLE physical layer with the audio receiving device, the baseband data and protocol processor drive the wideband RF transceiver module to establish the connected isochronous stream link based on the high-speed physical layer with the audio receiving device through the BLE asynchronous connection-oriented link, the baseband data and protocol processor is further configured to confirm whether the audio receiving device supports an ultra-low latency wireless audio transmission through the BLE asynchronous connection-oriented link, the baseband data and protocol processor is configured to drive the BLE radio frequency transceiver module to establish the BLE connected isochronous stream link based on the BLE physical layer with the audio receiving device through the BLE asynchronous connection-oriented link, and transmit a second audio data to the audio receiving device through the BLE connected isochronous stream link; or, the baseband data and protocol processor is configured to transmit the second audio data to the audio receiving device through the BLE asynchronous connection-oriented link if the audio receiving device does not support the ultra-low latency wireless audio transmission; and the baseband data and protocol processor is configured to drive the wideband RF transceiver module to transmit the first audio data to the audio receiving device through the connected isochronous stream link based on the high-speed physical layer.

14. The device according to claim 13, wherein the data transmission rate of the high-speed physical layer is not lower than 4 Mbps, the high-speed physical layer comprises any one of a wireless local area network physical layer, a wireless ultra-wideband physical layer, or a predetermined wideband physical layer, a wireless frequency band in which the high-speed physical layer works is divided into N non-overlapping predetermined bandwidth channels, two adjacent sub-events within one isochronous interval uses different numbered channels based on a predetermined automatic frequency hopping rule, and N is a positive integer greater than 1.

* * * * *